United States Patent
McGill et al.

(10) Patent No.: US 7,000,017 B1
(45) Date of Patent: Feb. 14, 2006

(54) SYSTEM AND METHOD FOR DISTRIBUTING A SELECTED OBJECT AND FOR AUTOMATICALLY DISTRIBUTING THE OBJECTS THAT ARE ASSOCIATED WITH THE SELECTED OBJECT

(75) Inventors: Kevin S. McGill, Elk Ridge, UT (US); Hong Zhu, Provo, UT (US); Mark E. Roberts, Woodland Hills, UT (US); Ty H. Ellis, Elk Ridge, UT (US); Ted S. Haeger, Park City, UT (US); Richard H. Cox, Orem, UT (US); Kenneth W. Muir, Spanish Fork, UT (US); David A. Romanek, Payson, UT (US); Steve P. Townsend, American Fork, UT (US)

(73) Assignee: Novell, Inc., Provo, UT (US)

( * ) Notice: Subject to any disclaimer, the term of this patent is extended or adjusted under 35 U.S.C. 154(b) by 742 days.

(21) Appl. No.: 10/175,877

(22) Filed: Jun. 21, 2002

Related U.S. Application Data

(60) Provisional application No. 60/364,032, filed on Mar. 15, 2002.

(51) Int. Cl.
    *G06F 17/30* (2006.01)
(52) U.S. Cl. .................. 709/226; 709/223; 709/102; 707/103; 379/22; 379/2; 713/201
(58) Field of Classification Search ............... 709/105, 709/223, 226, 102; 707/103; 379/22; 713/201, 713/203
    See application file for complete search history.

(56) References Cited

U.S. PATENT DOCUMENTS

| | | | | |
|---|---|---|---|---|
| 5,692,183 | A * | 11/1997 | Hapner et al. | 707/103 R |
| 5,727,203 | A * | 3/1998 | Hapner et al. | 707/103 R |
| 5,848,419 | A * | 12/1998 | Hapner et al. | 707/103 R |
| 5,875,296 | A * | 2/1999 | Shi et al. | 713/202 |
| 6,115,549 | A   | 9/2000 | Janis et al. | |
| 6,154,747 | A * | 11/2000 | Hunt | 707/100 |
| 6,463,454 | B1 * | 10/2002 | Lumelsky et al. | 718/105 |
| 6,516,354 | B1 * | 2/2003 | Cavanaugh | 719/316 |
| 6,636,585 | B1 * | 10/2003 | Salzberg et al. | 379/22 |
| 6,662,230 | B1 * | 12/2003 | Eichstaedt et al. | 709/229 |
| 6,678,355 | B1 * | 1/2004 | Eringis et al. | 379/22 |
| 2002/0055972 | A1 * | 5/2002 | Weinman | 709/203 |
| 2002/0138582 | A1 * | 9/2002 | Chandra et al. | 709/206 |
| 2003/0028489 | A1 * | 2/2003 | Williamson | 705/59 |

OTHER PUBLICATIONS

Del-Fabbro et al., Data management in grid application providers, IEEE, 2005, Proceeding of the First International Conference on Distribution Frameworks for Multimedia Applications (DFMA'05).*

(Continued)

*Primary Examiner*—Khanh Dinh
(74) *Attorney, Agent, or Firm*—Pillsbury Winthrop Shaw Pittman LLP

(57) ABSTRACT

A system and method for distributing objects to one or more subscribers. The system/method allows an administrator to create a distribution by allowing the administrator to select one or more objects for distribution to the subscriber(s). Once the distribution is defined, the distribution can be used any number of times and be sent to any number of subscribers without having to re-define or modify the distribution. Advantageously, the system/method automatically determines the objects that are associated with the objects selected for distribution by the administrator and automatically distributes the selected objects together with the objects that are associated with the selected objects.

13 Claims, 7 Drawing Sheets

OTHER PUBLICATIONS

Misra et al., A protocol for internet -scale utility-oriented distributed computing, IEEE, 2004, Proceeding of the 24th International Conference on Distributed Computing Systems (ICDS'04).*

"Automatic Software Distribution of Java Applications", http://www.javaworld.com/javaworld/jw-05-1996/jw-05-westerkamp.html, printed Mar. 4, 2002, 9 pages.

* cited by examiner

SYSTEM AND METHOD FOR DISTRIBUTING A SELECTED OBJECT AND FOR AUTOMATICALLY DISTRIBUTING THE OBJECTS THAT ARE ASSOCIATED WITH THE SELECTED OBJECT

This application claims the benefit of U.S. Provisional Patent Application No. 60/364,032, filed on Mar. 15, 2002, the contents of which are incorporated herein.

CROSS REFERENCE TO RELATED APPLICATIONS

This application is related to the following commonly owned U.S. patent applications, all of which are hereby incorporated by reference into the present application: (1) U.S. patent application Ser. No. 10/175,811, filed on even date herewith, entitled "System and Method for Distributing Application Objects," and (2) U.S. patent application Ser. No. 10/175,843, filed on even date herewith, entitled "System and Method for Distributing Selected Objects From a Source Database to a Destination Database."

BACKGROUND OF THE INVENTION

1. Field of the Invention

The present invention is related to the field of distributing selected objects and automatically distributing objects associated with the selected objects.

2. Discussion of the Background

Distribution of objects, such as software and other objects, has become an industry within an industry. Manufacturers of software products have the difficult task of distributing software products to system administrators. And system administrators have the difficult task of maintaining synchronization of software versions across the network of computers that they administer.

Software tools have been developed to address the data distribution needs of system administrators. One problem with some such existing tools is that they do not give an administrator the ability to define a distribution without binding any application specific information until it is time to replicate this information. Additionally, existing distribution tools do not give the administrator the ability to select an object for distribution and automatically distribute the selected object together with the objects that are associated with the selected object. Other drawbacks exist.

SUMMARY OF THE INVENTION

The present invention provides a system and method for distributing objects, such as software application objects and other objects. The system/method allows administrators to create a distribution by selecting one or more objects for distribution. Once the distribution is defined, the distribution can be used any number of times and be sent to any number of destination databases without having to re-define or modify the distribution. Advantageously, the system/method automatically determines the objects that are associated with the objects selected for distribution by the administrator and automatically distributes the selected objects together with the objects that are associated with the selected objects. Other advantages exist.

In one aspect, a system according to one embodiment of the present invention includes a distributor server and a subscriber server. The distributor server executes a first software module that is referred to as the "Distributor" and a second software module that is referred to as the "Distributor Agent." The subscriber server executes a software module that is referred to as the "Subscriber."

The Distributor Agent allows an administrator (or other user) to define a distribution to be distributed to Subscribers. That is, the Distributor Agent allows the administrator to select for distribution one or more objects that are stored in a database (also referred to as "source database"). The source database may be a hierarchical database, such as a directory or other hierarchical database. The Distributor Agent may also allow the administrator to specify: (a) whether the source database structure should be maintained at the destination, (b) whether object associations should be maintained, (c) a build time, and/or (d) a distribution time. If the administrator specifies that the source database structure should be maintained, then the administrator must specify a source-root-context. The source-root-context is the distinguished name (DN) of a node within the source database. If the administrator specifies a source-root-context, then the administrator selects for distribution those objects that are within the source-root-context.

After the administrator defines the distribution, the Distributor Agent creates a distribution object that corresponds to the defined distribution and stores the distribution object in a database. For each object that the administrator selected for distribution, the distribution object contains the object's DN. Thus, the distribution object contains a list of DNs (i.e., one DN for each object selected for distribution). Also included in the distribution object is the source-root-context, build time, and/or distribution time, if any, specified by the administrator.

In one embodiment, in defining a distribution, the administrator does not specify any information concerning the Subscriber. Thus, no Subscriber information is stored in the distribution object. Rather, information concerning the Subscriber is stored in a separate object called a "subscriber object," which is described below. This feature enables the distribution to be sent to more than one Subscriber without having to re-define or modify the distribution. This provides a certain amount of flexibility that conventional distribution systems do not provide.

Referring now to the Distributor, the Distributor is operable to retrieve a distribution object from the database, build a distribution package based on the distribution object, determine the one or more Subscribers that are subscribed to (i.e., associated with) the distribution object, and distribute the distribution package to the one or more Subscribers.

In one embodiment, the process performed by the Distributor for building a distribution package includes the following: (a) select a DN from the DN list included in the retrieved distribution object; (b) retrieve from the source database the object referenced by the selected DN; (c) create for the object a relative DN based on the selected DN (the process of creating a relative DN is described in the following paragraph); (d) store in the distribution package the object along with its relative DN; (e) examine the object's file related attributes to determine whether there are any files that are associated with the object, and include those files in the distribution package; (f) determine all of the objects that are associated with the object in question if the administrator specified that object associations should be maintained; (g) include in the distribution package the files associated with the objects determined in step (f); (h) for each object determined in step (f): create a relative DN for the object and store in the distribution package the object along with its relative DN; (i) determine whether all of the DNs in the DN list have been selected; (j) if all have not been selected, select another DN from the list and repeat steps (b)–(j); and (k) if the administrator specified a source-root-context, then include the source-root-context in the distribution package.

A relative DN for an object is determined as follows. If the administrator specified a source-root-context, then the relative DN is the difference between the source-root-context and the object's DN. For example, if the source-root-context is "Novell.US" and if the DN of the object is: "object1.Engineering.Novell.US," then the relative DN for that object will be "object1.Engineering". But, if the administrator specify not to maintain the database structure, then the relative DN is simply the last component of the object's DN. Using the above example, if the administrator did not specify a source-root-context, then the relative DN for the object in question is simply: "object1".

Referring now to the Subscriber, the Subscriber has a corresponding subscriber object stored in a database. A subscriber object defines the properties for its corresponding Subscriber and contains information concerning the Subscriber, such as the network address and/or domain name of the subscriber server on which the Subscriber executes and/or other information concerning the Subscriber. The subscriber object also contains a working-context. The working-context is the DN of a node within a destination database where objects are to be stored and to which the Subscriber has access. Like the source database, the destination database may be a hierarchical database, such as a directory or other hierarchical database.

In one embodiment, a Subscriber is subscribed to a distribution by associating the Subscriber's subscriber object with the distribution's distribution object. Thus, in one embodiment, the Distributor determines the Subscribers that are subscribed to a distribution by determining the subscriber objects that are associated with the distribution's distribution object.

Upon receiving a distribution package distributed by the Distributor, a Subscriber accesses its subscriber object to determine the working-context stored in the subscriber object. After determining the working-context, the Subscriber selects an object included in the package, obtains from the package the selected objects relative DN or creates a relative DN for the object if a relative DN for the object is not included in the package (the Subscriber uses the same method as the Distributor for creating the relative DN), and appends the object's relative DN to the working-context, thereby creating a new DN for the selected object. The selected object with the new DN is then added to the destination database. If any part of the new DN does not exist in the destination database, then the Subscriber will create the appropriate container objects and add them to the destination database so that the selected object can be added to the destination database without error.

Additionally, the Subscriber modifies the selected objects attributes as needed to accommodate the new environment in which the selected object is stored. For example, if the selected object contains an attribute that includes a DN of an object associated with the selected object, then the Subscriber creates a new DN and sets the attribute to the new DN.

After selecting an object from the distribution package and performing the steps describe above, the Subscriber repeats the above described process until all objects in the distribution package have been selected and added to the destination database. Further, the Subscriber stores onto a non-volatile storage medium (e.g., the subscriber server's hard disk or other storage medium) the files included in the distribution package.

Because the Distributor automatically determines the objects that are associated with the objects selected for distribution by the administrator and automatically includes those objects in the distribution package, the administrator is relieved of the burden of specifying each object that is associated with the objects selected for distribution. This not only makes the administrator's job much easier, but also ensures that all of the objects associated with the objects selected for distribution are distributed along with the objects, thereby ensuring that there are no missing dependencies in the distribution.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

While the present invention may be embodied in many different forms, there is described herein in detail an illustrative embodiment with the understanding that the present disclosure is to be considered as an example of the principles of the invention and is not intended to limit the invention to the illustrated embodiment.

Figure 1:
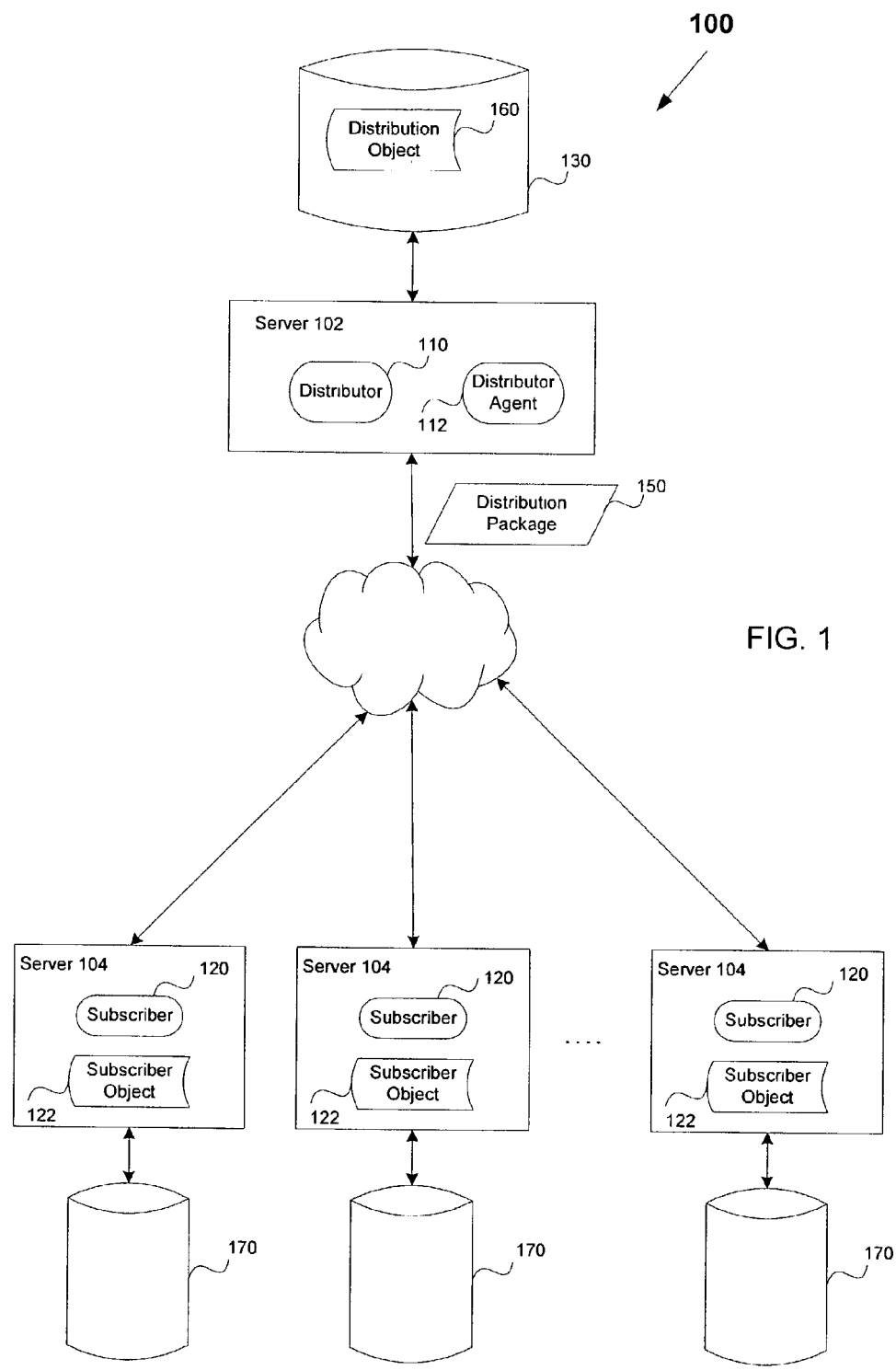
FIG. 1 is a functional block diagram of an object distribution system according to one embodiment of the invention.

FIG. 1 is a functional block diagram of an object distribution system 100, according to one embodiment of the invention, for distributing objects to subscribers. An object comprises a set of information. System 100 includes a distributor server 102 and one or more subscriber servers 104. Distributor server 102 includes a first software module 110 (referred to as Distributor 110) and a second software module 112 (referred to as Distributor Agent 112). Subscriber server 104 includes a software module 120 (referred to as Subscriber 120). Although Distributor 110 and Distributor Agent 112 are shown as being separate software modules, one skilled in the art will appreciate that they could be combined into a single software module. Additionally, one skilled in the art will appreciate that any of the software modules described herein could be implemented as a single software module or as multiple software modules. Similarly, one skilled in the art will appreciate that system 100 may include any number of distributor servers 102.

Each Subscriber 120 has a corresponding subscriber object 122. Each Subscriber object 122 contains information concerning its corresponding Subscriber 120, such as the network address and/or domain name of the subscriber server 104, on which the Subscriber 120 executes, and/or other information concerning the Subscriber 120. Each Subscriber object 122 also contains a working-context. The working-context is the DN of a node within a destination database 170 to which the Subscriber 120 has access. The destination database 170 may be a hierarchical database, such as a directory or other hierarchical database.

Distributor Agent 112 allows an administrator to define a distribution to be distributed to one or more Subscribers 120. That is, Distributor agent 112 allows the administrator to select for distribution one or more objects that are stored in a source database 130. Like destination database 170, source database 130 may be a hierarchical database, such as a directory or other hierarchical database. Distributor agent 112 may also allow the administrator to specify (a) whether the structure of database 130 should be maintained at the destination databases, (c) whether object associations should be maintained (c) a build time, and/or (d) a distribution time.

If the administrator specifies that the structure of database 130 should be maintained at the destination databases, then the administrator specifies a source-root-context. The source-root-context is the distinguished name (DN) (also referred to as "pathname") of a node within source database 130. If the administrator specifies a source-root-context, then the administrator selects for distribution those objects that are within the source-root-context.

After the administrator defines the distribution, Distributor agent 112 creates a distribution object 160 that corresponds to the defined distribution and stores the distribution object in a database (e.g., database 130 or another database). For each object that the administrator selected for distribution, Distributor agent 112 includes in the distribution object 160 the selected object's DN. Thus, the distribution object 160 contains a list of DNs (i.e., one DN for each object selected for distribution). Also included in the distribution object 160 is the source-root-context, build time, and/or distribution time, if any, specified by the administrator. Additionally, if the administrator specifies that database structure should be maintained and/or object associations should be maintained, then maintain database structure and maintain-object-association flags in distribution object 160 are set to TRUE.

In one embodiment, in defining a distribution, the administrator does not specify any information concerning the final destination(s) (i.e., Subscribers 120) of the distribution. Thus, no Subscriber information is stored in the distribution object 160. Rather, the Subscriber information is stored in one or more subscriber objects. This feature enables the distribution to be sent to more than one Subscriber 120 without having to re-define the distribution or modify the distribution object 160. This provides a certain amount of flexibility that conventional distribution systems do not provide.

Referring now to Distributor 110, Distributor 110 is operable to retrieve a distribution object from wherever it is stored, build a distribution package 150 based on the distribution object, determine the one or more Subscribers 120 that are subscribed to the distribution corresponding to the distribution object, and distribute distribution package 150 to the one or more Subscribers 120. In one embodiment Distributor 110 distributes a distribution package 150 by transmitting it to a Subscriber 120.

Figure 2A:
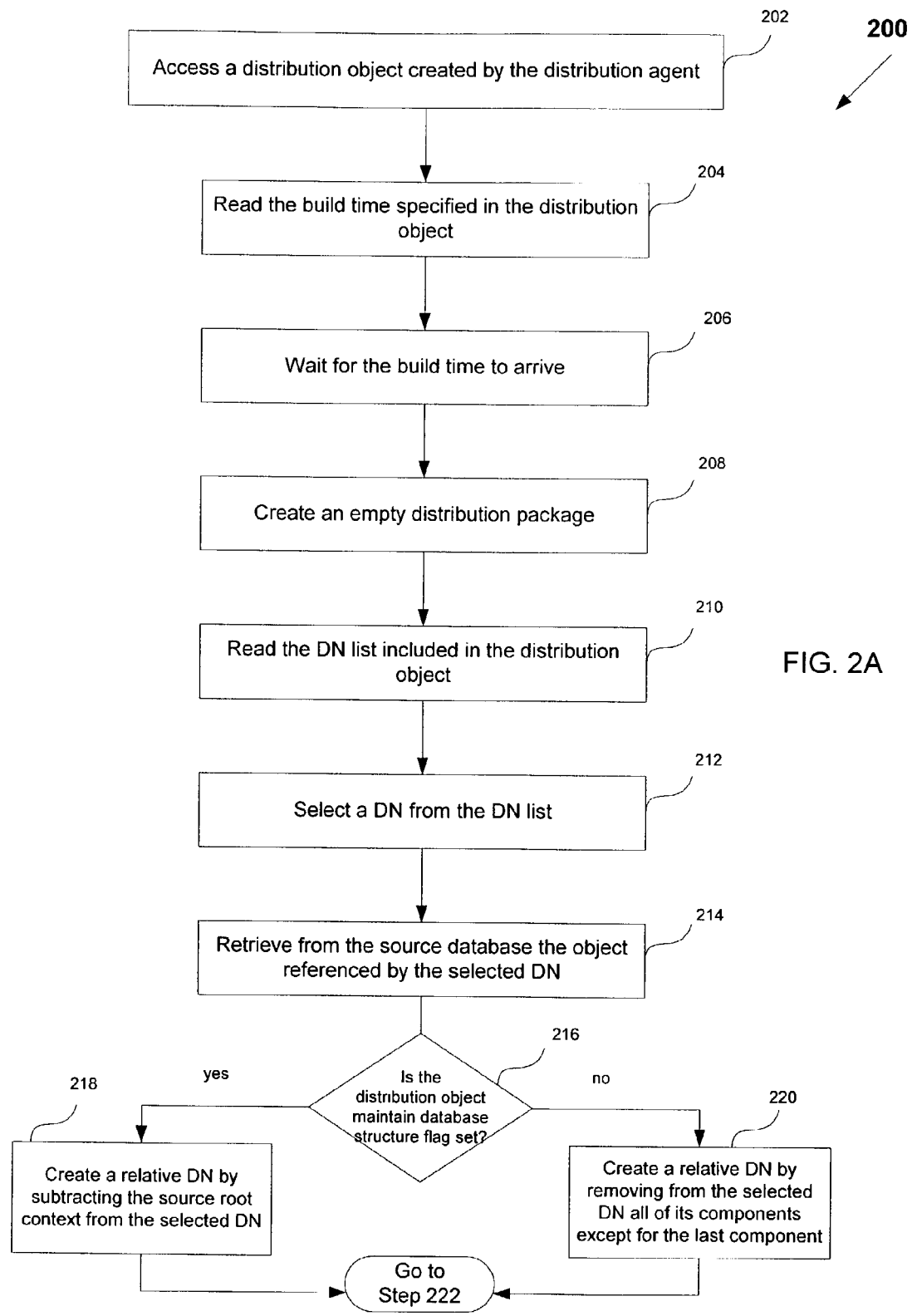
FIGS. 2A and 2B are a flow chart illustrating a process according to one embodiment of the invention.
Figure 2B:
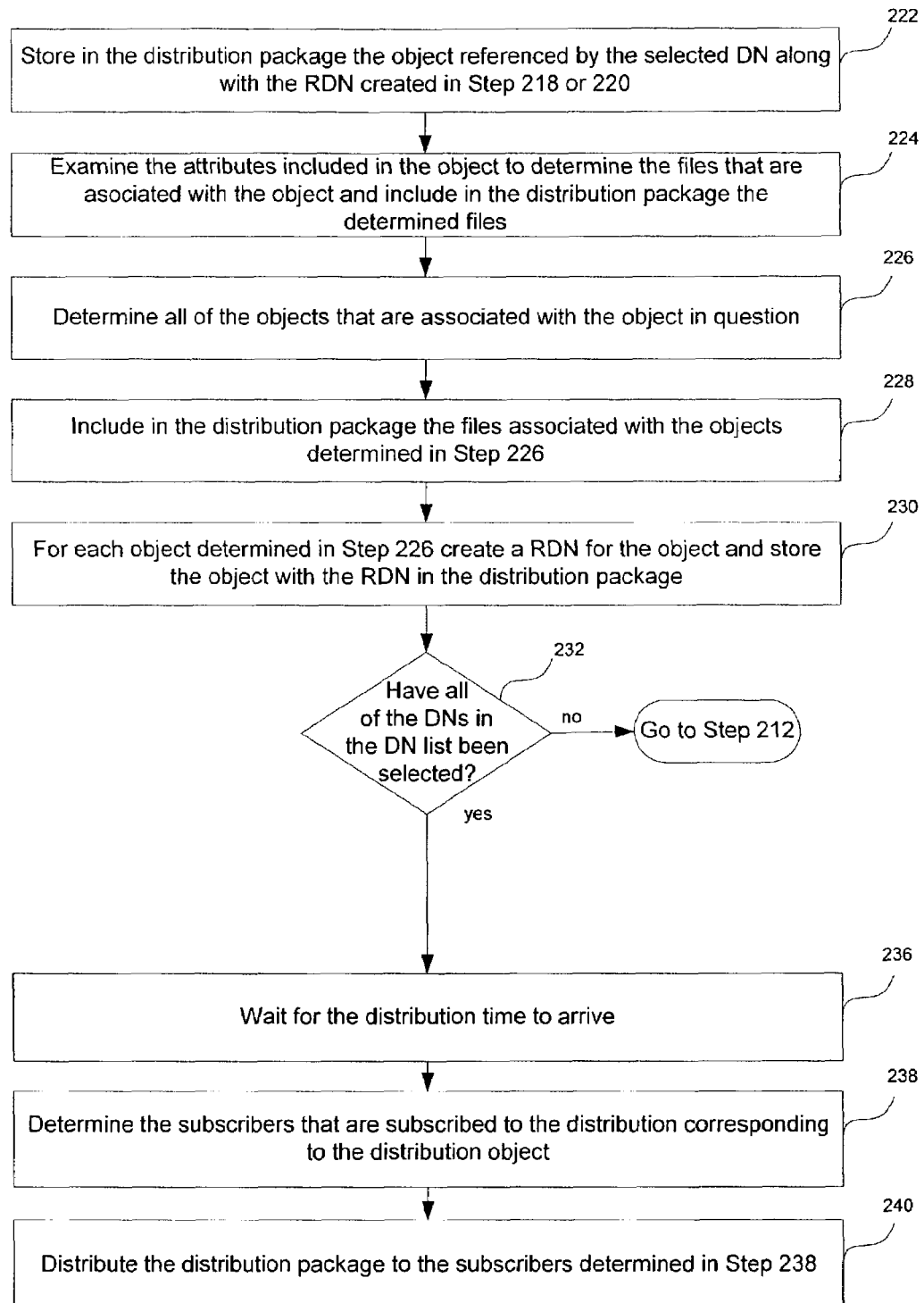

FIGS. 2A and 2B are a flow chart illustrating a process 200 that is performed by Distributor 110. Process 200 begins in step 202, where Distributor 110 accesses a distribution object 160 created by Distribution Agent 112. In step 204, Distributor 110 reads the build time specified in distribution object 160. In step 206, Distributor 110 waits for the build time to arrive. Once the build time is reached, control passes to step 208.

In step 208, Distributor 110 creates an empty distribution package 150. In step 210, Distributor 110 reads the DN list included in distribution object 160. In step 212, Distributor 110 selects a DN from the DN list. In step 214, Distributor 110 retrieves from source database 130 the object referenced by the selected DN. In step 216, Distributor 110 determines whether distribution object 160 maintain database structure flag is set. If distribution object 160 maintain database structure flag is set, control passes to step 218, otherwise control passes to step 220.

In step 218, Distributor 110 creates a relative DN by subtracting the source-root-context from the selected DN. For example, if the source-root-context is "Novell.US" and if the selected DN is: "object1.Engineering.Novell.US", then the relative DN is: "object1.Engineering." In step 220, Distributor 110 creates a relative DN by removing from the selected DN all of its components except for the last component. Using the above example, if distribution object 160 does not include a source-root-context, then the relative DN is simply: "object1". In step 222, Distributor 110 stores in the distribution package 150 the object referenced by the selected DN along with the relative DN created in step 218 or 220. In one embodiment, steps 218 and 220 can be skipped. In this embodiment, step 222 is changed so that Distributor 110 stores in the distribution package 150 the object referenced by the selected DN along with the selected DN.

In step 224, Distributor 110 examines attributes included in the object to determine the files (e.g., data files, executable files, and other files) that are associated with the object and includes in the distribution package the determined files. In step 225, Distributor 110 determines whether the administrator has selected to maintain object associations by examining the maintain-object-associations flag. If the administrator has selected to maintain object associations, the control passes to step 226, otherwise control passes to step 232.

In step 226, Distributor 110 determines all of the objects that are associated with the object. The associated objects include objects of the same type as the object associated with the selected DN as well as objects of a different type. For example, if the selected object is an application object, which is an object that stores information about a software application, then the associated objects can be other application objects as well as user-group objects or any other type of object.

In step 228, Distributor 110 includes in the distribution package the files associated with the objects determined in step 226. In step 230, Distributor 110, for each object determined in step 226, creates a relative DN for the object and stores the object with the relative DN in the distribution package (the relative DN will either be the object's DN minus the source-root-context or the last component of the object's DN depending on whether a source-root-context is included in the distribution object).

In step 232, Distributor 110 determines whether all of the DNs in the DN list have been selected. If all have not been selected, control passes back to step 212, where Distributor 110 selects from the list another DN that has not already been selected.

In step 236, Distributor 110 determines the Subscribers 120 that are subscribed to the distribution corresponding to distribution object 160. In one embodiment, a Subscriber 120 is subscribed to a distribution by associating the Subscriber's subscriber object with the distribution's distribution object. Thus, in step 236, Distributor 110 determines the Subscribers 120 that are subscribed to a distribution by determining the subscriber objects 122 that are associated with the distribution object 160. Distributor 110 distributes distribution package 150 to the Subscribers 120 determined in step 236. After step 236, Distributor 110 may select another distribution object and repeat the above process.

Upon receiving distribution package 150 distributed by Distributor 110, a Subscriber 120 accesses its subscriber object 122 to determine the working-context stored in the subscriber object. After determining the working-context, the Subscriber 120 selects an object included in distribution package 150, creates a relative DN for the selected object if one is not included in package 150, and appends the object's relative DN to the working-context, thereby creating a new DN for the selected object. The selected object with the new DN is then added to the Subscriber's destination database 170. If any part of the new DN does not exist in the destination database 170, then the Subscriber 120 will create the appropriate container objects and add them to the destination database 170 so that the selected object can be added to the destination database 170 without error. Additionally, the Subscriber 120 modifies the selected objects attributes as needed to accommodate the new environment in which the selected object is stored. For example, if the selected object contains an attribute that includes a DN of an object associated with the selected object, then the Subscriber 120 creates a new DN and sets the attribute to the new DN.

After selecting an object from the distribution package and performing the steps describe above, the Subscriber 120 repeats the above described process until all objects in the distribution package have been selected and added to the destination database 170. Further, the Subscriber 120 stores onto a non-volatile storage medium 180 (e.g., the subscriber's hard disk or other storage medium) the files included in the distribution package.

Figure 3:
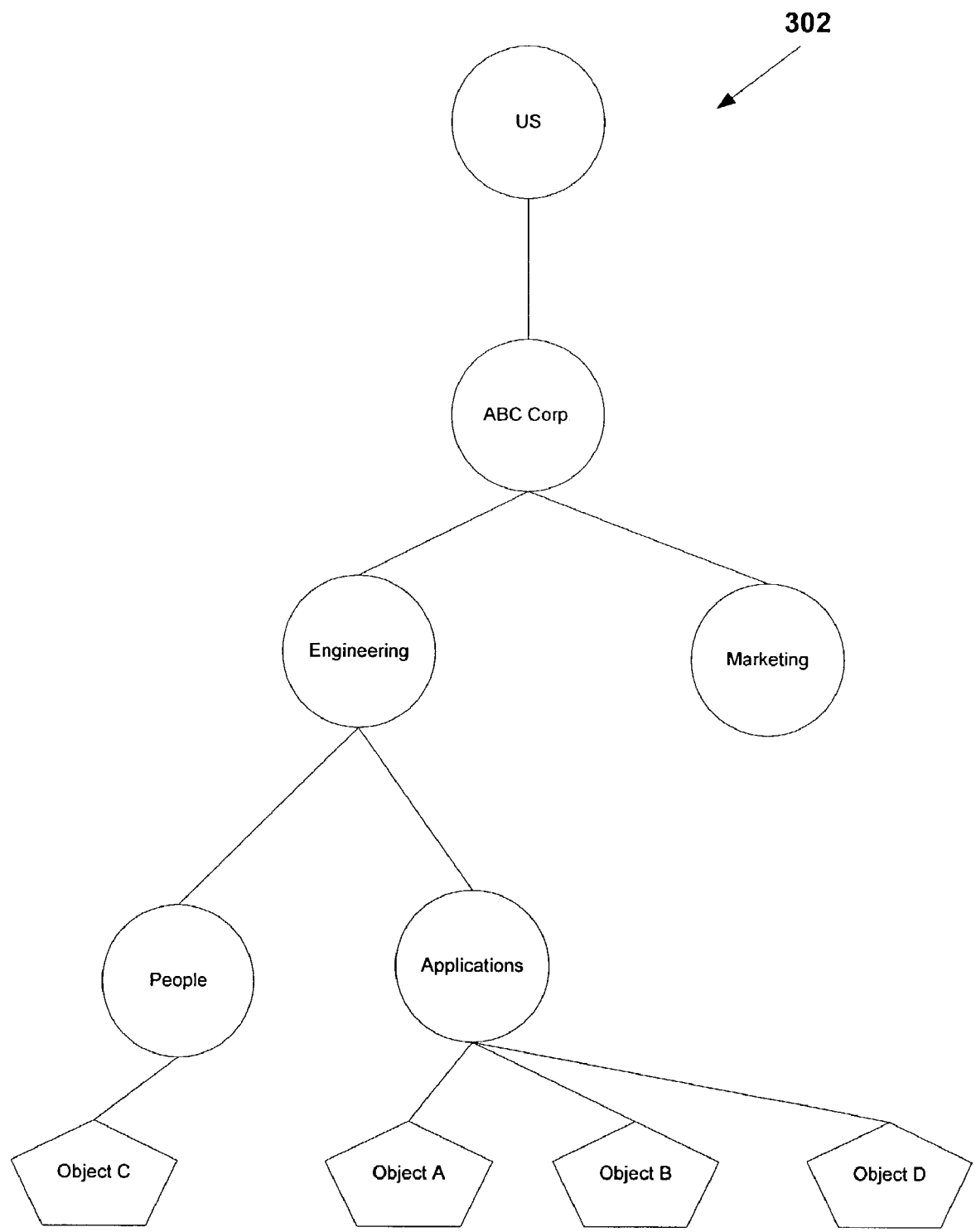
FIG. 3 illustrates an example source directory.
Figure 4:
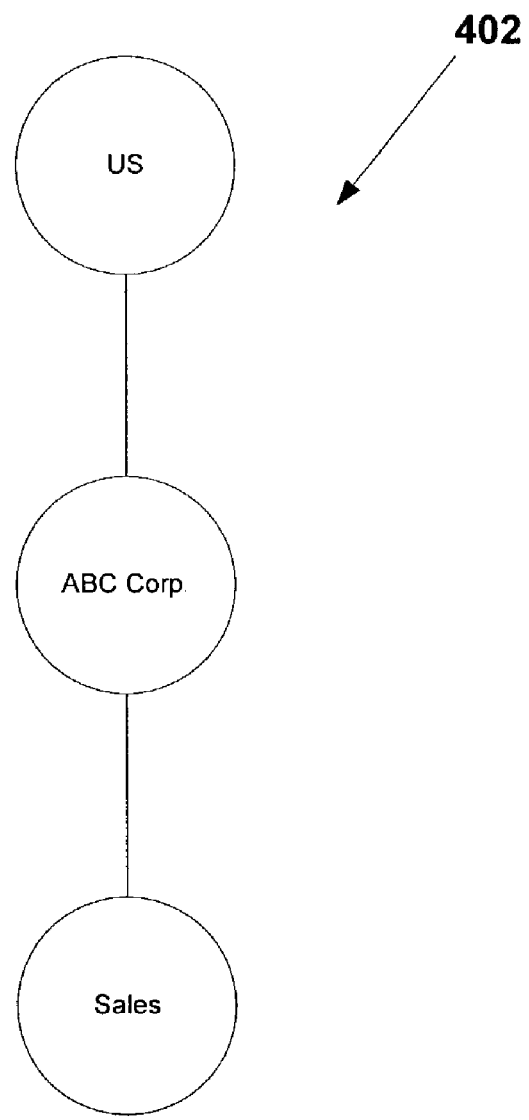
FIG. 4 illustrates an example Subscriber destination directory.
Figure 5:
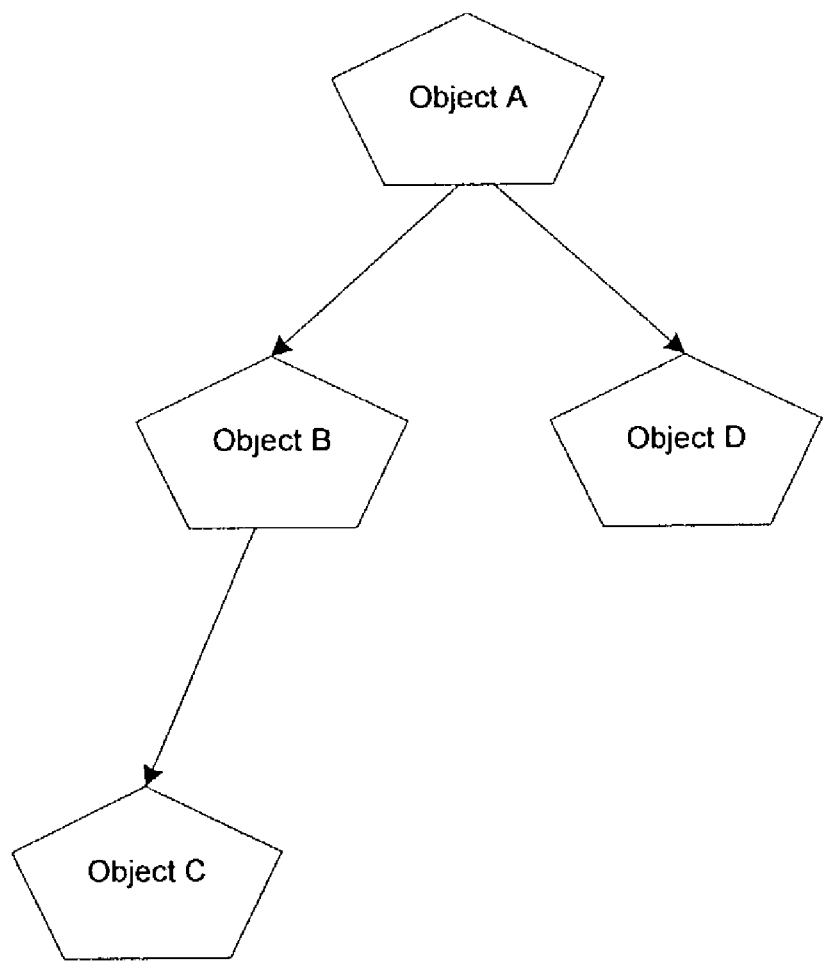
FIG. 5 illustrates the relationship among objects stored in the source directory.
Figure 6:
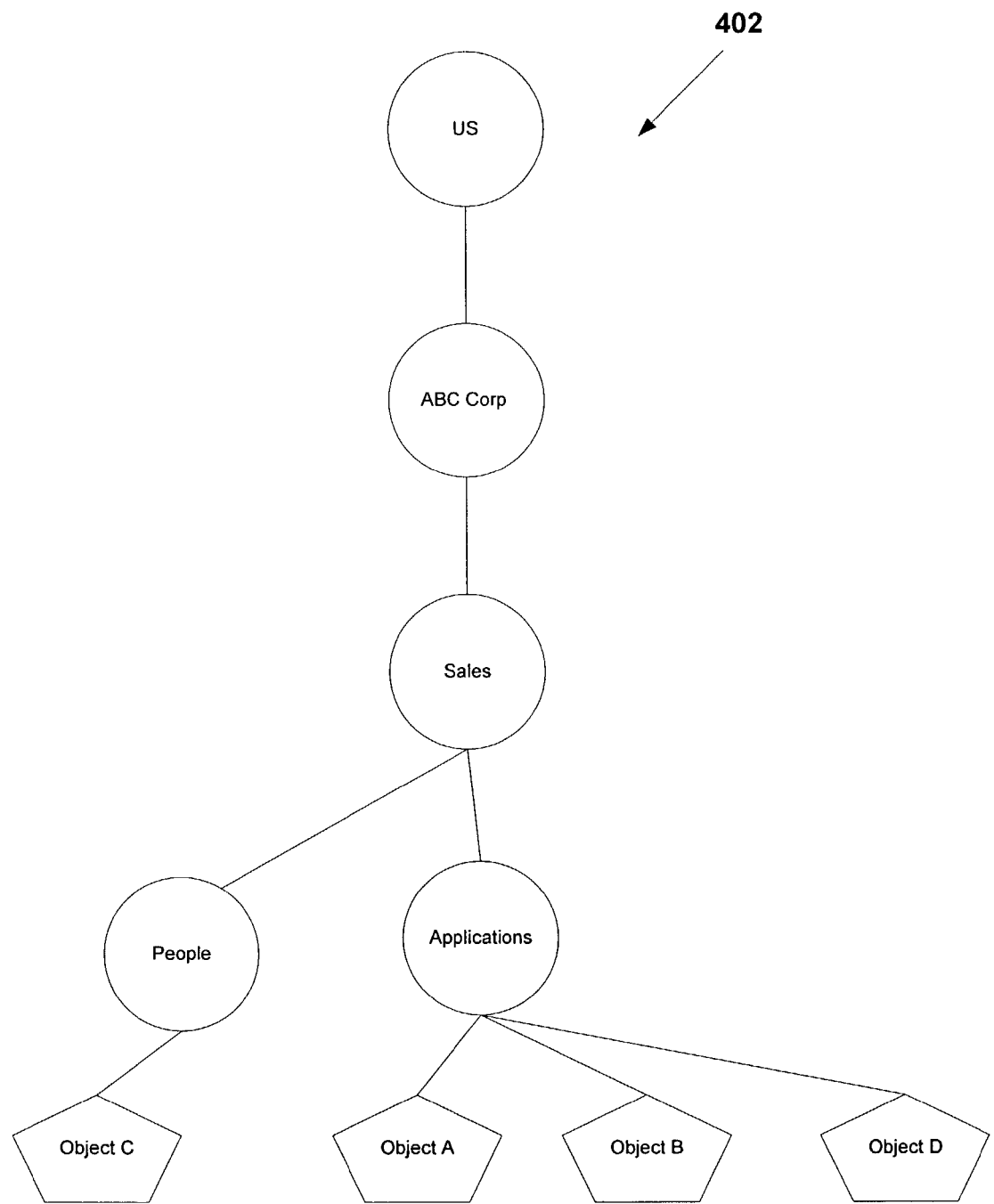
FIG. 6 illustrates the destination directory after the object A is distributed to the Subscriber.

For illustration, FIG. 3 shows an example source database 302. In this example, source database 302 is a directory that includes the following leaf objects: object A, object B, object C, and object D; and FIG. 4 shows an example Subscriber destination database 402. FIG. 5 shows the relationship among object A, object B, object C, and Object D. As shown in FIG. 5, object A references object B and object D, and object B references object C. Thus, objects B, C and D are all associated with object A, and object C is associated with object B. It should be noted that object C is indirectly associated with object A. It should also be noted that if other objects were associated with object C, then those other objects would be considered to be associated with object A because object C is associated with object A. Thus, the number of objects that may be associated with object A can be N, where N is a number greater than or equal to zero. In other words, the objects that are associated with object A may have an "X" width and a "Y" depth, where X and Y are numbers greater than or equal to zero. If an administrator selects object A for distribution to the Subscriber and specifies the following source-root-context: "Engineering.ABC Corp.US", and the Subscriber's working-context is set to "Sales.ABC Corp.US", then FIG. 6 shows destination directory 402 after object A is distributed to the Subscriber. As shown in FIG. 6, not only is object A distributed to the Subscriber and inserted into database 402, but also objects B, C and D are automatically distributed to the Subscriber and inserted into database 402.

While the processes illustrated herein may be described as a series of consecutive steps, none of these processes are limited to any particular order of the described steps. Additionally, it should be understood that the various illustrative embodiments of the present invention described above have been presented by way of example only, and not limitation. Thus, the breadth and scope of the present invention should not be limited by any of the above-described exemplary embodiments, but should be defined only in accordance with the following claims and their equivalents.

What is claimed is:

1. A method for distributing a selected object from a source database to a destination database and automatically distributing a second object associated with the selected object, the method comprising:

providing a distributor server for:

enabling a user to select for distribution one or more selected objects stored in a source database, wherein each of the selected objects is uniquely identified by an object identifier and includes at least one associated object;

enabling the user to specify whether the source database structure should be maintained at a destination database;

creating a distribution object;

including in the distribution object the object identifier of each selected object and a source-root-context if the user specified that the source database structure should be maintained at the destination database, building a distribution package based on the distribution object, wherein the distribution package contains the selected objects identified by the object identifiers contained in the distribution object and associated second objects;

determining subscribers that are associated with the distribution object;

distributing the distribution package to the determined subscribers; and providing a subscriber server associated with the distribution object for:

receiving the distribution package;

accessing each selected object and associated second object contained in the distribution package upon receiving the distribution package distributed by the distributor server;

determining working-context stored within the subscriber object;

selecting a first object included in the distribution package;

obtaining from the distribution package a relative identifier for the selected object or creating a relative identifier for the selected object if the relative identifier is not included with the distribution package;

appending the relative identifier to the working-context, wherein a second identifier is created for the selected object; and adding the selected object with the second identifier to the destination database.

2. The method of claim 1, wherein the source database is a directory, the object identifiers are distinguished names, and the source-root-context is the distinguished name of a node within the directory.

3. The method of claim 1, wherein building the distribution package further comprises creating a relative object identifier for the selected object and including the relative object identifier in the distribution package.

4. The method of claim 1, wherein building the distribution package further comprises including in the distribution package the object identifier that identifies the selected object.

5. A system for distributing a selected object from a source database to a destination database and automatically distributing a second object associated with the selected object, the system comprising:
   a distributor software module;
   a distributor-agent software module;
   a subscriber software module; and
   a subscriber object, wherein
   the distributor-agent software module is operable to:
      enable a user to select for distribution one or more selected objects stored in a source database, wherein each of the selected objects is uniquely identified by an object identifier and includes at least one associated object;
      enable the user to specify whether the source database structure should be maintained at a destination database;
      create a distribution object;
      include in the distribution object the object identifier of each selected object and a source-root-context if the user specified that the source database structure should be maintained at the destination database;
   the distributor software module operable to:
      build a distribution package based on the distribution object, wherein the distribution package contains the selected objects identified by the object identifiers contained in the distribution object and associated second objects;
      determine subscribers that are associated with the distribution object;
      distribute the distribution package to the determined subscribers; and
   the subscriber software module is operable to:
      receive the distribution package;
      access each selected object and associated second object contained in the distribution package upon receiving the distribution package distributed by the distributor server;
      determine working-context stored within the subscriber object;
      select a first object included in the distribution package;
      obtain from the package a relative identifier for the selected object or creating a relative identifier for the selected object if the relative identifier is not included with the distribution package;
      append the relative identifier to the working-context, wherein a second identifier is created for the selected object; and
      add the selected object with the second identifier to the destination database.

6. The system of claim 5, wherein the source database is a directory, the object identifiers are distinguished names, and the source-root-context is the distinguished name of a node within the directory.

7. The system of claim 5, wherein, in building the distribution package, the distributor software module creates a relative object identifier for the selected object and includes the relative object identifier in the distribution package.

8. The system of claim 5, wherein, in building the distribution package, the distributor software module further includes in the distribution package the object identifier that identifies the selected object.

9. A computer program product for distributing a selected object for automatically distributing objects that are associated with the selected object, the computer program product being embodied in one or more computer readable mediums and comprising computer instructions for:
   enabling a user of a distributor server to select for distribution one or more selected objects stored in a source database, wherein each of the selected objects is uniquely identified by an object identifier and includes at least one associated object;
   enabling the user to specify whether the source database structure should be maintained at a destination database;
   creating a distribution object;
   including in the distribution object the object identifier of each selected object and a source-root-context if the user specified that the source database structure should be maintained at the destination database;
   building a distribution package based on the distribution object, wherein the distribution package contains the selected objects identified by the object identifiers contained in the distribution object and associated second objects;
   determining subscribers that are associated with the distribution object;
   distributing the distribution package to the determined subscribers;
   receiving the distribution package by a subscriber server;
   accessing each selected object and associated second object contained in the distribution package upon receiving the distribution package distributed by the distributor server;
   determining the working-context stored within the subscriber object;
   selecting a first object included in the distribution package;
   obtaining from the distribution package a relative identifier for the selected object or creating a relative identifier for the selected object if the relative identifier is not included with the distribution package;
   appending the relative identifier to the working-context, wherein a second identifier is created for the selected object; and
   adding the selected object with the second identifier to the destination database.

10. The computer program product of claim 9, wherein the source database is a directory, the object identifiers are distinguished names, and the source-root-context is the distinguished name of a node within the directory.

11. The computer program product of claim 9, wherein the computer instructions for building the distribution package further comprises computer instructions for creating a relative object identifier for the selected object and including the relative object identifier in the distribution package.

12. The computer program product of claim 9, wherein the computer instructions for building the distribution package further comprises computer instructions for including in the distribution package the object identifier that identifies the selected object.

13. A system for distributing a selected object from a source database to a destination database and automatically distributing a second object associated with the selected object, the system comprising:

enabling means for enabling a user to select for distribution one or more selected objects stored in a source database, wherein each of the selected objects is uniquely identified by an object identifier and includes at least one associated object and for enabling the user to specify whether the source database structure should be maintained at a destination database;

creating means for creating a distribution object;

including means for including in the distribution object the object identifier of each selected object and a source-root-context if the user specified that the source database structure should be maintained at the destination database;

building means for building a distribution package based on the distribution object, wherein the distribution package contains the selected objects identified by the object identifiers contained in the distribution object and associated second objects;

determining means for determining the subscribers that are associated with the distribution object;

distributing means for distributing the distribution package to the determined subscribers;

receiving means provided for on a subscriber server for receiving the distribution package;

accessing means for accessing each selected object and associated second object contained in the distribution package upon receiving the distribution package distributed by the distributor server;

determining means for determining working-context stored within the subscriber object;

selecting means for selecting a first object included in the distribution package;

obtaining means for obtaining from the package a relative identifier for the selected object or creating a relative identifier for the selected object if the relative identifier is not included with the distribution package;

appending means for appending the relative identifier to the working-context, wherein a second identifier is created for the selected object; and adding means for adding the selected object with the second identifier to the destination database.

* * * * *